Oct. 14, 1952 M. H. EMRICK 2,613,786
AIR-COOLED TAPPING ATTACHMENT
Filed Jan. 15, 1949

INVENTOR
MELVIN H. EMRICK
BY
Howard Thompson
ATTORNEY

Patented Oct. 14, 1952

2,613,786

UNITED STATES PATENT OFFICE 2,613,786

AIR-COOLED TAPPING ATTACHMENT

Melvin H. Emrick, Jamaica, N. Y.

Application January 15, 1949, Serial No. 71,179

8 Claims. (Cl. 192—113)

This invention relates to tapping attachments. More particularly, the invention deals with an attachment of the character described having means providing a circulation of air through the attachment to cool the working parts. Still more particularly, the invention includes a multiple blade fan element arranged in the attachment to stimulate air circulation therethrough.

The novel features of the invention will be best understood from the following descriptions, when taken together with the accompanying drawing, in which certain embodiments of the invention are disclosed, and in which the separate parts are designated by suitable reference characters in each of the views; and in which.

Figure 1:
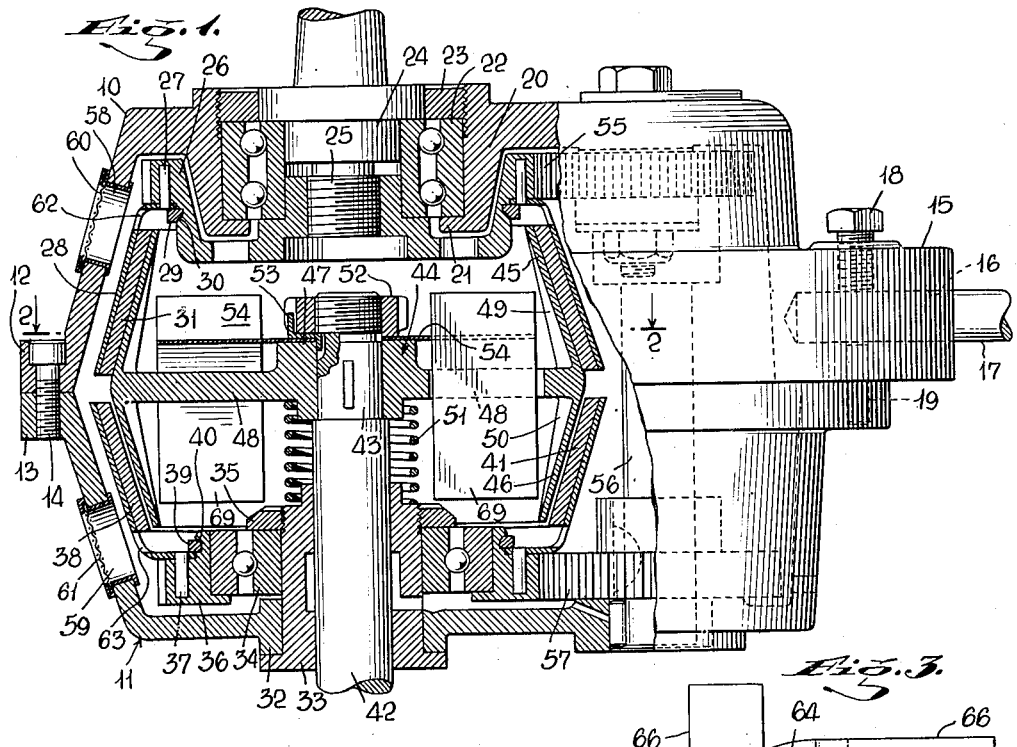
Fig. 1 is a side and sectional view through an attachment, made according to my invention.

In Fig. 1 of the drawing, I have shown a tapping attachment, generally of the structure disclosed in my prior application Ser. No. 30,720 filed June 2, 1948, the attachment being modified to the extent hereinafter more specifically defined in producing what I term an air cooled tapping attachment. The attachment as shown in the accompanying drawing comprises a casing having an upper part 10, a lower part 11, the parts having at adjacent surfaces, abutting flanges 12 and 13 secured together by screws 14. The upper part 10 has a laterally extending boss 15 apertured, as indicated at 16, for reception of a rod 17, the rod being secured in position by set screws 18. This structure serves to retain the attachment against movement in a machine when the attachment is in operation.

I also preferably employ a key pin 19 between the casing parts adjacent the boss 15, as a matter of further reinforcement in the coupling of the parts. The upper casing 10 has a tubular bearing portion 20, having at its inner end an inwardly extending flange 21. Seated in the bearing portion 20 is a double-race ball bearing, as seen at 22, held in position by a sleeve 23. Mounted in the bearing 22 is a lower end 24 of a tapered spindle having a reduced threaded extension 25 with which is coupled the upper drive gear 26. The gear 26 is of V-cup-shaped formation. The gear has circumferentially spaced key pins 27 for keying a conical drive shell 28 to the gear, the shell being held in place by a spring ring 29 seating in an annular groove 30 in the gear. Secured to the inner surface of the drive shell 28 is a friction facing 31, the facing being secured to the shell in any desired manner.

The lower casing part 11 has a tubular bearing portion 32 in which is mounted a flanged sleeve 33. On the sleeve 33 is mounted a ball bearing 34, held in position on the sleeve and in conjunction with the bearing 32, by a nut 35. Mounted on the bearing 34 is a reverse drive gear 36. The gear 36 has circumferentially spaced key pins 37 for keying a reverse drive conical shell 38 to the gear, the shell being held against displacement from the gear by a split spring ring 39 operating in a groove 40 in the gear. On the inner surface of the shell 38 is arranged a friction facing 41 secured to the shell in any suitable manner.

Arranged within the sleeve 33 is a shaft or spindle 42, on the upper reduced end 43 of which is mounted a driving head 44 having oppositely tapered and relatively thin wall portions 45 and 46, adapted to operatively engage the forward and reverse drive cones, as in other devices of this kind. This head is generally referred to as a double-faced conical clutch head. The tapered end portions 45 and 46 join the hub portion 47 of the head 44 in a plurality of spiders or webs 48, as clearly seen in Fig. 2 of the drawing.

The tapered portions 45 and 46 are strengthened by circumferentially spaced ribs or fins 49 and 50, which stimulate cooling and also operate to stimulate air circulation through the attachment, as will be apparent. Between the head 44 and the sleeve 33 is arranged a coil spring 51 which normally serves to support the head in the forward or direct drive position, as will be apparent. A nut 52 is mounted on the threaded portion of the reduced extension 43, to hold the head 44 in position, the nut having suitable keying means, as at 53. This nut also serves to support my improved fan element or device 54 in position on the head, at the right of the casing, as seen in Fig. 1, the usual drive between the drive gear 26 and the reverse drive gear 36. As this part of the attachment forms no direct part of the present invention, it will only be briefly referred to as follows:

A gear 55 meshes with the gear 26 and with another gear, not shown, on a shaft 56, the latter having a gear 57 which meshes with the gear 36.

Each casing part 10 and 11 has one or more vent openings, one opening being shown at 58 on the part 10 and one opening 59 on the part 11, each opening is preferably screened, as seen at 60 and 61. The drive shell 28 has adjacent the base thereof, or near the upper end of the cone, as seen in Fig. 1, circumferentially spaced vent openings 62 and the cone 38 has similar vent openings 63. These openings are disposed adjacent the vents 58 and 59 so that in the rotation of the conical shells, air can be freely circulated from the vents into the interior of the shells and the head 44.

Figure 2:
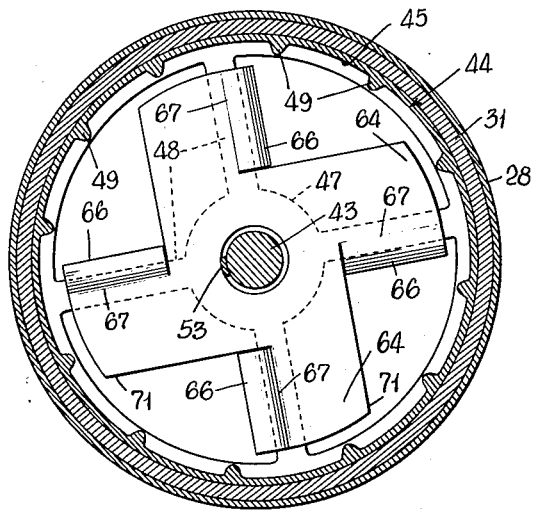
Fig. 2 is a section substantially on the line 2—2 of Fig. 1, showing only part of the attachment.
Figure 3:
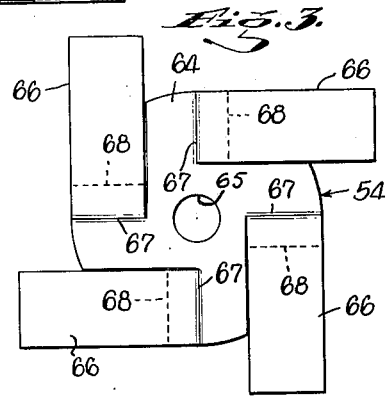
Fig. 3 is a plan view of a blank, from which the fan element or device is formed.
Figure 4:
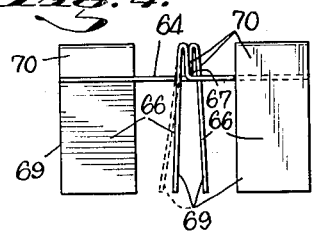
Fig. 4 is a side edge view of the device in folded or operative position.

The fan element or device 54 is shown in blank, in Fig. 3 of the drawing, and comprises a circular type center body portion 64, apertured centrally, as seen at 65, for reception of the end 43 of the spindle 42. The disc body 64 has tangentially disposed and extending blade elements 66, four of which are shown in the accompanying drawing. In forming the fan device from the blank, as seen in Fig. 3, the blades 66 are first folded upwardly along the lines 67 and then downwardly on the line 68, producing a result substantially similar to that illustrated in Fig. 4, in other words, blade ends 69 which extend below the disc 64, and preferably flared to a slight extent and upper double wall end portions 70. The ends 69 have a reasonable amount of flexibility and these ends bear upon the webs 48 and extend below said webs, as is clearly illustrated in Figs. 1 and 2 of the drawing.

Considering Fig. 2 of the drawing, it will appear that the blade ends 69 bear against the webs 48 and are thus backed by the webs in one directional drive of the attachment and this arrangement of the blades form large openings through the head and in the disc portion 64, as clearly seen in said figure. These openings provide for the free circulation of air through the attachment. The disc portion 64 in itself forms a fan-like element and while this disc portion is shown substantially horizontal in the accompanying drawing, it is quite apparent that the tip portions, as at 71, could be offset to produce of the disc portion, a substantially fan-like body which would assist in the control of circulation of air through the attachment. In operation, the air is drawn into the lower part of the attachment through one or more openings 59 and is circulated inwardly and outwardly around the head and cones, and then discharged through one or more openings 58 in the upper casing part. In other words, by utilizing a simple fan element or device, shaped from a sheet of metal, in the manner disclosed and by making slight changes in the structure of the attachment, a positive and stimulating circulation of air is provided through the attachment which will operate to maintain lower temperatures between the operating parts which is desirable, particularly in the operation of high speed tapping attachments.

In addition to the action of the fan element, the fins 49 aid in air circulation and further operate as a cooling means, dissipating the heat flow to fins which are radially cooled in circulation of air therearound. The fins 49 also give added strength to the thin wall structure of the head and in this respect, the weight of the head is reduced, while at the same time, the required strength in the head is maintained. Here it is to be understood that the structure of and spacing of the fins may be made to control the desired results required.

The attachment operates in the manner of other devices of this kind. In other words, in the forward drive of the driven shaft 42, the cone 28 operates upon the head 44, then in the upward feed of a tap through a workpiece the head 44 is drawn into engagement with the cone 38 against the action of the spring 51 in the reverse drive of the shaft 42.

Having fully described my invention, what I claim as new and desire to secure by Letters Patent is:

1. In tapping attachments of the class described employing a casing, a drive spindle and a driven shaft in the casing, forward and reverse drive conical shells, means placing said shells in operative engagement with the drive spindle, a double-faced conical clutch head intermittently movable into engagement with said shells in the forward and reverse drive of the driven shaft, said head having a central hub portion joining the periphery of the head in a web structure, a fan element detachably mounted on the hub and engaging the web structure, said conical drive shells having circumferentially spaced apertures, and said casing adjacent the apertures of said shell having vent passages, whereby in the operation of the attachment, a forced circulation of air is provided through the attachment by said fan element.

2. In tapping attachments of the class described employing a casing, a drive spindle and a driven shaft in the casing, forward and reverse drive conical shells, means placing said shells in operative engagement with the drive spindle, a double-faced conical clutch head intermittently movable into engagement with said shells in the forward and reverse drive of the driven shaft, said head having a central hub portion joining the periphery of the head in a web structure, a fan element detachably mounted on the hub and engaging the web structure, said conical drive shells having circumferentially spaced apertures, said casing adjacent the apertures of said shell having vent passages, whereby in the operation of the attachment, a forced circulation of air is provided through the attachment by said fan element, and said fan element comprising a series of blades arranged in the head longitudinally with respect to the axis of said head.

3. In tapping attachments of the class described employing a casing, a drive spindle and a driven shaft in the casing, forward and reverse drive conical shells, means placing said shells in operative engagement with the drive spindle, a double-faced conical clutch head intermittently movable into engagement with said shells in the forward and reverse drive of the driven shaft, said head having a central hub portion joining the periphery of the head in a web structure, a fan element detachably mounted on the hub and engaging the web structure, said conical drive shells having circumferentially spaced apertures, said casing adjacent the apertures of said shell having vent passages, whereby in the operation of the attachment, a forced circulation of air is provided through the attachment by said fan element, said fan element comprising a series of blades arranged in the head longitudinally with respect to the axis of said head, and a disc portion defined by circumferentially spaced parts integrally joining the blades.

4. In tapping attachments of the class described employing a casing, a drive spindle and a driven shaft in the casing, forward and reverse drive conical shells, means placing said shells in operative engagement with the drive spindle, a double-faced conical clutch head intermittently movable into engagement with said shells in the forward and reverse drive of the driven shaft, said head having a central hub portion joining the periphery of the head in a web structure, a fan element detachably mounted on the hub and engaging the web structure, said conical drive shells having circumferentially spaced apertures, said casing adjacent the apertures of said shell having vent passages, whereby in the operation of the attachment, a forced circulation of air is provided through the attachment by said fan element, said fan element comprising a series of blades arranged in the head longitudinally with respect to the axis of said head, a disc portion defined by circumferentially spaced parts integrally joining the blades, and each conical portion of the head having on the inner surface thereof, circumferentially spaced fins.

5. In tapping attachments of the class described employing a casing, a drive spindle and a driven shaft in the casing, forward and reverse drive conical shells, means placing said shells in operative engagement with the drive spindle, a doubled-faced conical clutch head intermittently movable into engagement with said shells in the forward and reverse drive of the driven shaft, said head having a central hub portion joining the periphery of the head in a web structure, a fan element detachably mounted on the hub and engaging the web structure, said conical drive shells having circumferentially spaced apertures, said casing adjacent the apertures of said shell having vent passages, whereby in the operation of the attachment, a forced circulation of air is provided through the attachment by said fan element, and inner surfaces of the conical portions of said head having circumferentially spaced fins.

6. In tapping attachments of the class described employing a casing, a drive spindle and a driven shaft in the casing, forward and reverse drive conical shells, means placing said shells in operative engagement with the drive spindle, a double-faced conical clutch head intermittently movable into engagement with said shells in the forward and reverse drive of the driven shaft, said head having a central hub portion joining the periphery of the head in a web structure, means detachably mounted on said head forming a series of circumferentially spaced air circulating blades, and means on the casing and said cones providing circulation of air into the casing around the cones and through said head.

7. In tapping attachments of the class described employing a casing, a drive spindle and a driven shaft in the casing, forward and reverse drive conical shells, means placing said shells in operative engagement with the drive spindle, a double-faced conical clutch head intermittently movable into engagement with said shells in the forward and reverse drive of the driven shaft, said head having a central hub portion joining the periphery of the head in a web structure, means detachably mounted on said head forming a series of circumferentially spaced air circulating blades, means on the casing and said cones providing circulation of air into the casing around the cones and through said head, and the tapered conical portions of said head having circumferentially spaced ribs.

8. In tapping attachments of the class described employing a casing, a drive spindle and a driven shaft in the casing, forward and reverse drive conical shells, means placing said shells in operative engagement with the drive spindle, a double-faced conical clutch head intermittently movable into engagement with said shells in the forward and reverse drive of the driven shaft, said head having a central hub portion joining the periphery of the head in a web structure, the casing, cones and said head having means providing forced circulation of air through the attachment, said last named means comprising circumferentially spaced radially extending fan blades detachably fixed to said central hub portion, and circumferentially spaced fins on said head and arranged longitudinally with respect to the axis of said head.

MELVIN H. EMRICK.

REFERENCES CITED

The following references are of record in the file of this patent:

UNITED STATES PATENTS

| Number | Name | Date |
|---|---|---|
| 719,033 | Norris | Jan. 27, 1903 |
| 1,023,272 | Oakes | Apr. 16, 1912 |
| 1,064,412 | White | June 10, 1913 |
| 1,509,937 | Down | Sept. 30, 1924 |
| 1,671,443 | Norris | May 29, 1928 |
| 1,872,483 | Meyer | Aug. 16, 1932 |
| 1,988,967 | Emrick | Jan. 22, 1935 |
| 2,222,764 | Gaston | Nov. 26, 1940 |
| 2,231,465 | Emrick | Feb. 11, 1941 |
| 2,243,334 | Eksergean | May 27, 1941 |
| 2,299,796 | Chase | Oct. 27, 1942 |
| 2,357,923 | Anderson | Sept. 12, 1944 |
| 2,380,387 | Allen | July 31, 1945 |
| 2,454,471 | Momberg | Nov. 23, 1948 |
| 2,500,071 | Hans | Mar. 7, 1950 |